F. C. FARNSWORTH.
STEAM TRAP.
APPLICATION FILED NOV. 30, 1910.

1,006,740.

Patented Oct. 24, 1911.

2 SHEETS—SHEET 1.

Witnesses
A. M. Kelly
M. G. Egan

Inventor
Frederick C. Farnsworth
By
Attorney

F. C. FARNSWORTH.
STEAM TRAP.
APPLICATION FILED NOV. 30, 1910.
1,006,740.
Patented Oct. 24, 1911.
2 SHEETS—SHEET 2.
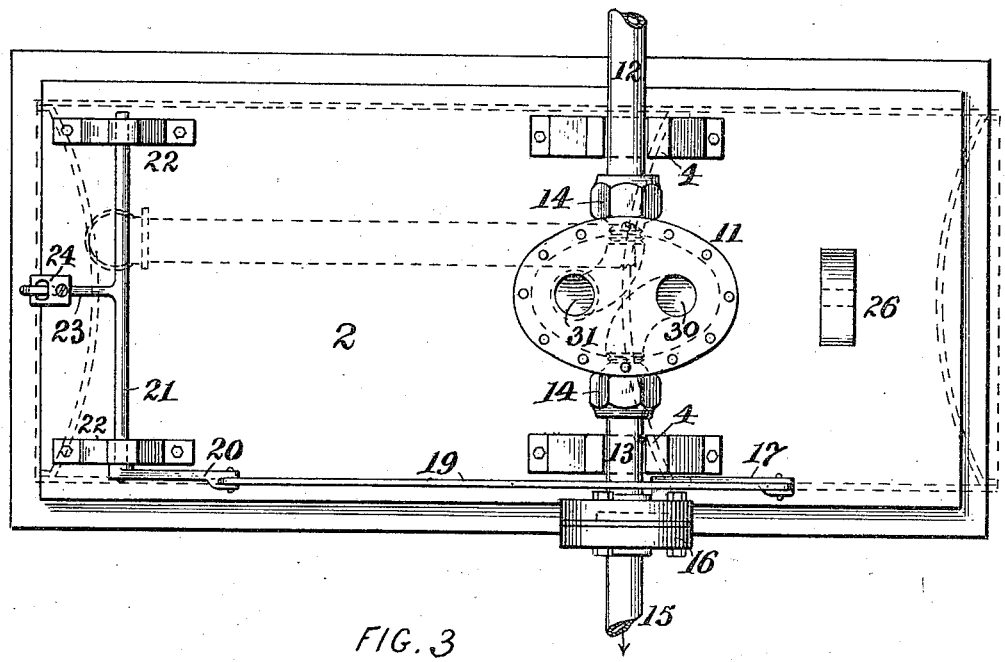
FIG. 3
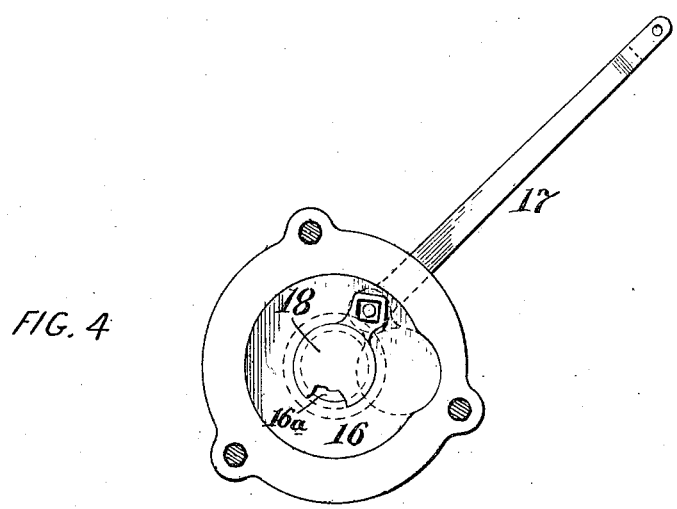
FIG. 4
Witnesses
Inventor
Frederick C. Farnsworth
By 
Attorney
COLUMBIA PLANOGRAPH CO., WASHINGTON, D. C.

UNITED STATES PATENT OFFICE.

FREDERICK C. FARNSWORTH, OF BROOKLYN, NEW YORK.

STEAM-TRAP.

1,006,740.

Specification of Letters Patent. Patented Oct. 24, 1911.

Application filed November 30, 1910. Serial No. 594,829.

*To all whom it may concern:*

Be it known that I, FREDERICK C. FARNSWORTH, a citizen of the United States, and resident of city of Brooklyn, county of Kings, and State of New York, have invented an Improvement in Steam-Traps, of which the following is a specification.

My invention has reference to steam traps, and consists of certain improvements which are fully set forth in the following specification and shown in the accompanying drawings which form a part thereof.

The object of my invention is to provide a suitable construction of trap which shall be positive in action, rapid in operation and free from all delicate mechanism and small controlled passages which might be liable to clog or otherwise prove defective.

My object is further to provide a construction of trap which is especially adapted for handling water of condensation in great quantities and which shall have capacity during its normal operation of causing the water to be reduced in temperature before being discharged from the trap into the sewer or other place of use.

In general construction, my improved trap comprehends a pivoted tilting vessel having two compartments, one of which receives the water of condensation, and the other the collected water of condensation preliminary to its discharge through an automatically controlled valve, the water of condensation during its passage through the two compartments acting to produce a tilting operation of the vessel for the purpose of operating the discharge valve intermittently in accordance with the requirements, and also for transferring the hot condensed water from the receiving chamber into the discharge chamber in an intermittent manner whereby the water so received in the discharge chamber may be permitted to become lowered in temperature before being discharged through the discharge valve.

My invention comprehends features of construction in a machine of this form which are fully described hereinafter and more particularly defined in the claims. These improvements will be better understood by reference to the drawings, in which:—

Figure 1:
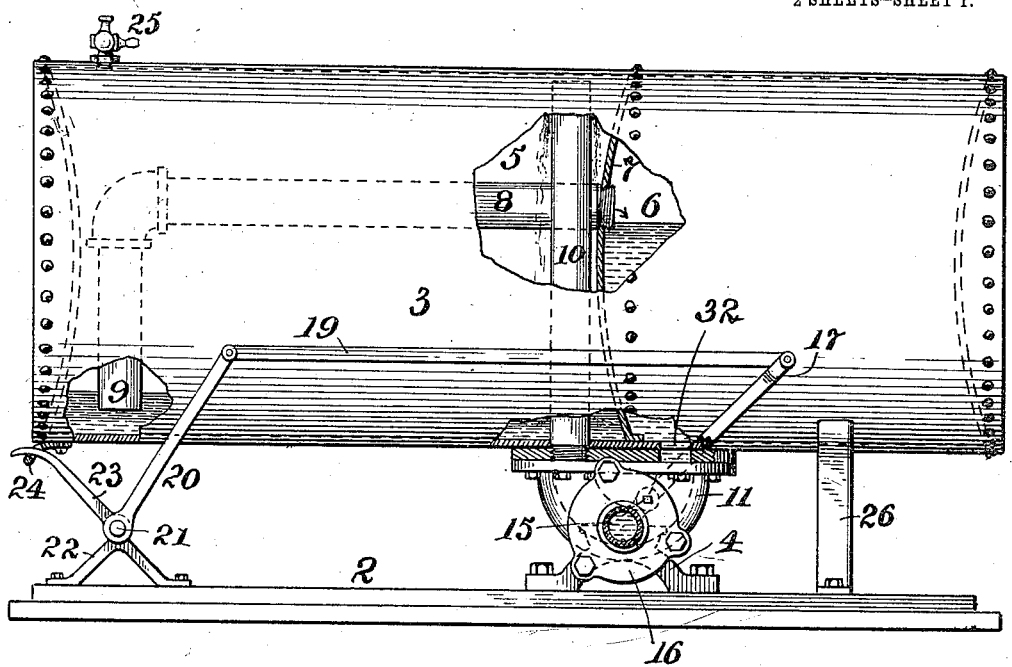
Figure 2:
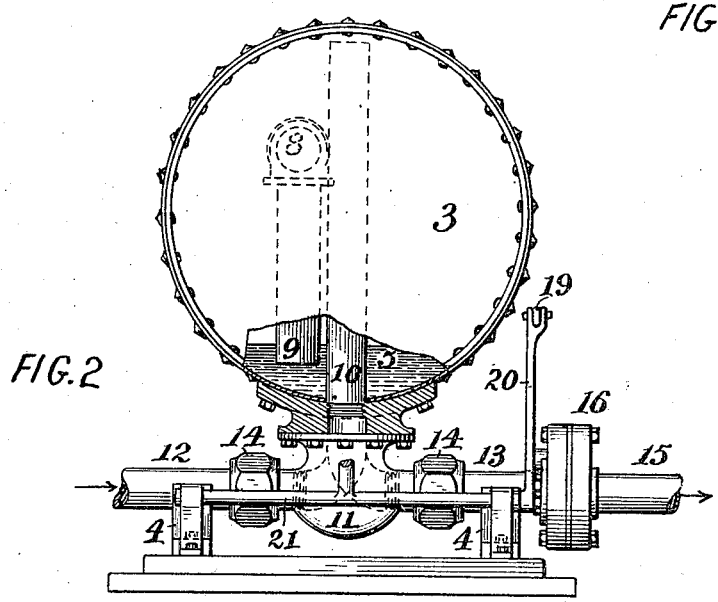

Figure 1 is a side elevation of a steam trap embodying my invention and with portions broken away to show internal construction; Fig. 2 is an end elevation of the same with a portion broken away; Fig. 3 is a plan view of the lower part of my improved steam trap; and Fig. 4 is an elevation of the control valve having the front face plate removed for the purpose of showing the interior.

2 is the bed and is provided with two pedestals or supports 4 for respectively receiving the supply pipe 12 through which the water of condensation is led to the steam trap, and a discharge pipe 13 connecting with the waste pipe 15 through the discharge valve 16.

3 is the tilting tank and may be made of sheet metal or otherwise, and is divided into two compartments 5 and 6 by a transverse division 7 which is arranged substantially above the pivot point of the tank. The only communication between the compartments 5 and 6 is by means of an L-shaped pipe having a horizontal part 8 opening through the division 7 into the upper portion of the compartment 6 and having the lower vertical part 9 opening into the compartment 5 near its bottom and also near its end most distant from the pivot. The tank 3 is provided on its lower part substantially below the division 7 with a cast iron head 11, having an inlet port 31 and an outlet port 30 (Fig. 3), the said outlet port 30 communicating through a port 32 in the bottom of the tank and opening into the compartment 6 preferably close to the division 7 therein. The inlet port 31 communicates with the bottom of a stand-pipe 10 which extends upwardly into the compartment 5 close to the division 7 and discharges the water of condensation into the said compartment near its top.

14 are trunnions which constitute coupling connections with the pipes 12 and 13 provide communication from said pipes respectively to the inlet port 31 and outlet port 30, and maintain the said connection while permitting oscillation of the tank and head 11 upon the ends of the pipes 12 and 13. This trunnion construction may be made in any suitable manner so long as the tank may oscillate while maintaining communication with the supply and discharge pipes.

16 is the discharge valve, and as before stated, is interposed between the pipe 13 and the discharge pipe 15 and in the preferred construction, it comprises a through passage 16ª with a swinging valve piece 18 arranged to control the said through passage, and this swinging valve piece 18 is oscillated by means of a lever 17. The lever 17 is connected by a link 19 with a lever 20 secured to a rock shaft 21 journaled in bearings 22 on the base or bed 2. The rock shaft 21 is provided with an operating arm 23 which extends through a loop 24 on the lower part and end of the tank 3, the connection being such, that as the tank tilts, it rocks the rock shaft 21 and thereby operates the valve.

As shown, it is preferable that the compartment 5 be somewhat longer than the compartment 6 so as to exert a normally greater leverage when receiving water of condensation to cause the tank to be tilted to lower the free end of this compartment and raise the compartment 6 forming the other end of the tank, from off the support 26. In the particular positions shown in Fig. 1, the compartment 6 has been filled with water of condensation from the compartment 5 through the pipe parts 8 and 9, and the weight of the water thus transferred from the compartment 5 to the compartment 6 has caused the tank to oscillate to the position indicated and which is preferably horizontal, though this exact position is not essential. When this position is assumed, the arm 23 of the rock shaft 21 is lifted so that the arm 20, link 19, and arm 17 moves the valve piece 18 to the position shown in dotted lines in Fig. 1 and full lines in Fig. 4, thereby closing the discharge into the waste pipe 15. The water in the compartment 6 discharges through the ports 32 and 30 into the pipe 13, thence through the valve 16 to the discharge pipe 15 when the valve is open, and while this operation is going on, water of condensation from the heating system or steam mains is passing through the supply pipe 12, port 31, pipe 10, and, entering the compartment 5, is delivered through pipes 8 and 9 into the compartment 6. The supply of water of condensation to compartment 5 may be practically continuous or at least continuous as far as the passage of water of condensation through the pipe 12 dictates. When the water is not being discharged from the compartment 6 through the valve 16, the compartment 6 remains filled and of substantially constant weight while the end of the tank 3 having the compartment 5 is gradually becoming heavier; and when these weights become such that the end of the tank having the compartment 5 becomes sufficiently heavy, said end will descend by gravity and automatically open the valve 16, permitting discharge from the compartment 6 and, at the same time, the water of condensation accumulating in the compartment 5 will be discharging through the pipes 9 and 8 into the compartment 6 until the preponderance of the loads of the two ends of the tank is reversed. This causes the tank to once more right itself to the horizontal position, and to again close the discharge valve 16. The compartment 6 will at this time be comparatively full of water and compartment 5 comparatively empty.

During the intermittent oscillations of the tank 3, as above described, there will be a continuous receiving of water of condensation in the compartment 5 and an intermittent discharge of water of condensation from the compartment 6. Compartment 6 is more or less sealed from reception of steam or hot vapor, and hence the water contained in the said compartment will have opportunity to reduce its temperature by cooling before being discharged through the discharge valve 16 and by pipe 15 to the sewer or other place of reception. When the end of the compartment 5 tilts downward, the water in said compartment will be thrown to the end in which the pipe 9 is located so that the bulk of the water of condensation in said compartment may be forced upward through the pipes into the compartment 6 with each oscillation of the tank, the transfer of the water from the compartment 5 to the compartment 6 being due to the pressure within the compartment 5 assisted by whatever suction may be produced within the compartment 6. The transfer of water through pipes 8 and 9 is more free than discharge of water from the compartment 6, hence this transfer will be continuous so long as there is sufficient water of condensation passing into compartment 5. The trap is therefore open at all times except when there is not sufficient supply of water of condensation to keep the compartment 5 loaded to overbalance the weight of load in compartment 6. When this takes place, it is due to the fact that as the compartment 6 discharges, the water from compartment 5 follows until compartment 5 becomes so light that the tank rocks to a horizontal position and closes the discharge valve. The compartment 6 will always remain pretty well filled with water, and this seals the trap against the escape of steam at all times. Further accumulations in the compartment 5 will repeat the discharging operation. In other words, the compartment 6 must intermittently discharge, whereas the compartment 5 may be continuously receiving water of condensation and continuously discharging into the compartment 6 except in the case of some back flow from compartment 6 when the tank is tilted from the horizontal position and at moment of opening valve 16. By properly proportioning the weights, I may insure the tilting of the tank to the horizontal position before the water in the tank is reduced so as to expose the end of the pipe 9 when the tank is tilted to the horizontal position, and hence this pipe 9 may always remain sealed and prevent escape of steam into the compartment 6 when the tank is in horizontal position. I, however, do not restrict myself to this particular level of the bottom of the pipe 9, as it will suffice to have it approximately sealed when any material amount of water is in the compartment.

The trap may be made of sheet metal or castings or in any other suitable manner. An air valve 25 may be arranged on the top of the compartment 5 to relieve the tank of air when starting up the apparatus so as to prevent it becoming air bound.

While I prefer that the upper open end of the stand-pipe 10 shall extend above the pipe 8 and discharge close to the top of the compartment 5, I do not confine myself in this respect. By discharging too low down into the tank there will be a tendency to produce condensation of steam passing in with the water and which would produce a vacuum in compartment 5 and thereby objectionably hold the water from flowing through pipes 8 and 9 into compartment 6. It is also to be understood that while the discharge takes place from the compartment 5 into the compartment 6 at the same time that discharge from the latter is taking place, this part of my invention may be effective even where the pipe 8 opens into the compartment 6 at a lower level, but it must be sufficiently high to prevent back flow of water from the compartment 6 into the compartment 5 to such extent as would interfere with the normal operation of the apparatus in the manner pointed out. Because of the fact that the discharge of the water through the discharge valve may continue while the water is flowing from the compartment 5 into the compartment 6, it will be understood that with such operation of the valve 16, there will be a greater discharge of water of condensation than the normal cubical capacity of the compartment 6 occupied by water at the initial starting of the discharge. It will also be understood that at no time will the discharge ports 30 and 32 be clear of water, as the valve 16 will always be closed before the compartment 6 can be fully discharged, by reason of the fact that because of the less rapid discharge of the water from the compartment 6 relatively to the discharge of water from the compartment 5 into the compartment 6, the tank will be overbalanced by accumulations of water in the compartment 5 before the water is all discharged from the compartment 6, and this overbalancing will necessarily operate to open the valve 16.

As all parts are proportioned to operate positively in a definite manner and all ports and passages are of large size, it is evident that there is no possibility of the same clogging or becoming defective in their operation. Moreover, as the valve is of a type which opens fully or closes fully, the action of the trap is positive and quick. Furthermore, the valve, being one which slides as distinguished from a cone or needle valve, operates at all times to keep itself clear and in no way forms an obstruction to the free passage of the water when it is desired to discharge the same through the valve and consequently, my improved trap is devoid of troubles which are so frequently experienced with steam traps which employ conical valves which open to a very slight extent under the action of a float or otherwise. Furthermore, I dispense with all float mechanism and all means which require delicate adjustment or manipulation, and consequently my improved trap is easily installed, easily kept in order, and very positive in operation.

I have shown my improved trap in the form which I have found excellently adapted for the purposes of the invention and especially for large traps, but I do not limit myself to the details shown, as these may be varied in design without departing from the spirit of the invention.

Having now described my invention what I claim as new and desire to secure by Letters Patent is:—

1. In a steam trap, the combination of a tank divided into two compartments and pivoted so as to tilt and in which there is a tubular passageway from the lower part of one of the compartments into the upper part of the other compartment, an inlet pipe for delivering water of condensation into the upper part of the compartment which has the passageway communicating with its lower portion, a discharge passage from the lower part of the other of the two compartments, a valve in the said discharge passage to control the discharge of water of condensation, and means actuated by the tilting of the tank for operating the valve to open or close it.

2. In a steam trap, the combination of a tank divided into two compartments and pivoted so as to tilt and in which there is a tubular passageway from the lower part of one of the compartments into the upper part of the other compartment, an inlet pipe for delivering water of condensation into the upper part of the compartment which has the passageway communicating with its lower portion, a discharge passage from the lower part of the other of the two compartments, a valve having a sliding valve piece for the purpose of fully opening or closing the valve at one operation arranged in the said discharge passage to control the discharge of water of condensation, and means actuated by the tilting of the tank for operating the valve to open or close it, whereby the tilting of the tank in one direction fully closes the valve and in the other direction fully opens the valve.

3. In a steam trap, the combination of a tilting tank having two compartments, one of which extends to a distance on one side of the pivot of the tank and the other of which extends to a lesser distance on the opposite side of the pivot and said compartments provided with a passageway opening from near the bottom of the compartment which projects to the greatest distance to one side of the pivot and communicates with the upper portion of the other compartment, a stationary supply pipe communicating through the pivot of the tank and discharging into the upper part of the compartment which extends to the greatest distance to one side of the pivot, a stationary discharge pipe communicating through the pivot with the bottom of the compartment which extends to lesser distance beyond the pivot, a valve in the discharge pipe, and means for operating the valve actuated by the tilting tank.

4. In a steam trap, the combination of a tilting tank having two compartments, one of which extends to a distance on one side of the pivot of the tank and the other of which extends to a lesser distance on the opposite side of the pivot, and said compartments provided with a passageway opening from near the bottom of the compartment which projects to the greatest distance to one side of the pivot and communicates with the upper portion of the other compartment, a stationary supply pipe communicating through the pivot of the tank and discharging into the upper part of the compartment which extends to the greatest distance to one side of the pivot, a stationary discharge pipe communicating through the pivot with the bottom of the compartment which exends to lesser distance beyond the pivot, a valve in the discharge pipe, means for operating the valve actuated by the tilting tank for closing the valve when the large end of the tank which projects to the greatest distance to one side of the pivot descends and vice versa, and a stop to limit the movement of the tank in the opposite direction so that it tilts to a greater extent in one direction than the other.

5. In a steam trap, the combination of a tilting tank having two compartments, one of which extends to a distance on one side of the pivot of the tank and the other of which extends to a lesser distance on the opposite side of the pivot, and said compartments provided with a passageway opening from near the bottom of the compartment which projects to the greatest distance to one side of the pivot and communicates with the upper portion of the other compartment, a stationary supply pipe communicating through the pivot of the tank and discharging into the upper part of the compartment which extends to the greatest distance to one side of the pivot, a stationary discharge pipe communicating through the pivot with the bottom of the compartment which extends to lesser distance beyond the pivot, a valve in the discharge pipe, means for operating the valve actuated by the tilting tank, consisting of a rock shaft having an arm actuated by the tank, a lever secured to the rock shaft, a lever for operating the valve, and a connecting link between the two levers, said parts all are arranged outside of the tank.

6. In a steam trap, a tank having a pivoted support and divided into a short compartment to one side of the pivoted support and a long compartment extending to the opposite side of the pivoted support and a communication from the upper portion of the short compartment into the lower and outermost portion of the long compartment, combined with an inlet passage opening through the pivot support and communicating with the upper part of the long compartment, a discharge passage opening through the pivot support and communicating with the lower part of the short compartment, a valve arranged outside of the tank in the discharge passage for controlling the discharge of water from the short compartment, and mechanically operating devices for fully opening the valve when the tank is so tilted that the long compartment is lowered and fully closing the valve when the long compartment is raised and the short compartment lowered.

7. In a steam trap, a tank having a pivoted support and divided into a short compartment to one side of the pivoted support and a long compartment extending to the opposite side of the pivoted support and a communication from the upper portion of the short compartment into the lower and outermost portion of the long compartment, combined with an inlet passage opening through the pivot support and communicating with the upper part of the long compartment, an air vent for discharging air from the upper part of the long compartment into the atmosphere, a discharge passage opening through the pivot support and communicating with the lower part of the short compartment, a valve arranged outside of the tank in the discharge passage for controlling the discharge of water from the short compartment, and mechanically operating devices for fully opening the valve when the tank is so tilted that the long compartment is lowered and fully closing the valve when the long compartment is raised and the short compartment lowered.

8. In a steam trap, a tank having a pivoted support and divided into a short compartment to one side of the pivoted support and a long compartment to the opposite side of the pivoted support and a communication from the upper portion of the short compartment into the lower and outermost portion of the long compartment, combined with an inlet passage opening through the pivot support and communicating with the upper part of the long compartment, a discharge passage opening through the pivot support and communicating with the lower part of the short compartment, a valve arranged outside of the tank in the discharge passage and having a sliding valve piece adapted to be opened or closed fully at each operation for controlling the discharge of water from the short compartment, and mechanically operating devices for fully opening the valve when the tank is so tilted that the long compartment is lowered and fully closing the valve when the long compartment is raised and the short compartment lowered.

9. In a steam trap, the combination of a tilting tank having two compartments and formed with a communication between the lower part of one of the compartments and the upper part of the other compartment, means for delivering water of condensation into the first mentioned compartment near its upper part, and means for discharging water of condensation from the lower part of the last mentioned compartment in an intermittent manner consisting of a valve and means for operating the valve actuated by the tilting of the tank, the construction and operation being such that the water received by the trap is transferred to the compartment in communication with the discharge means wherein it is permitted to partly cool before being discharged.

10. In a steam trap, the combination of two compartments having a continuous communication whereby the water received in one of the compartments may be discharged from the lower portion thereof into the upper portion of the other of the compartments, means for supplying water of condensation in a continuous manner into the first mentioned compartment from which it is discharged in a more or less continuous manner into the second mentioned compartment, intermittently acting means for discharging the water from the second mentioned compartment at intervals, and gravity actuated means for controlling the intermittently actuating means whereby the discharge of water from the second mentioned compartment only takes place when there is an excess of water in the first mentioned compartment.

11. In a steam trap, the combination of two compartments, means for delivering water of condensation into one of said compartments, means for causing the said water to pass from the said compartment into the other of the compartments, means for causing the water to be intermittently discharged from the last mentioned compartment, and devices for controlling the discharge means actuated by gravity and controlled by the amount of water present in the first mentioned compartment at any moment.

12. In a steam trap, the combination of two compartments, means for delivering water of condensation into one of said compartments, means for causing the said water to pass from the said compartment into the other of the compartments, means for causing the water to be intermittently discharged from the last mentioned compartment, and devices for controlling the discharge means actuated by gravity and controlled by the differential action of the weights of the water in the two compartments.

13. The herein described method of removing water of condensation from steam containing pipes or chambers, which consists in passing the water of condensation into a chamber in a continuous manner at a pressure above atmospheric pressure, intermittently discharging water of condensation from a second chamber under the controlling influence of the joint accumulations of water in the two chambers whereby the water is continually discharged from the second chamber so long and only so long as it is continuously supplied to the first chamber in quantity equal to or greater than the discharge, maintaining the discharge sealed against the escape of steam, and automatically transferring the water received in the first chamber into the second chamber under the pressure in the first chamber so long as the water continues to collect therein in quantity and be discharged from the second chamber.

In testimony of which invention, I hereunto set my hand.

FREDERICK C. FARNSWORTH.

Witnesses:
  LOWELL J. WHITEFORD,
  J. ELMER STOREY.

---

Copies of this patent may be obtained for five cents each, by addressing the "Commissioner of Patents, Washington, D. C."